Jan. 21, 1969  J. SCHNEIDER  3,422,539
BLOCK OR BRICK LAYING GUIDE
Filed Jan. 26, 1968
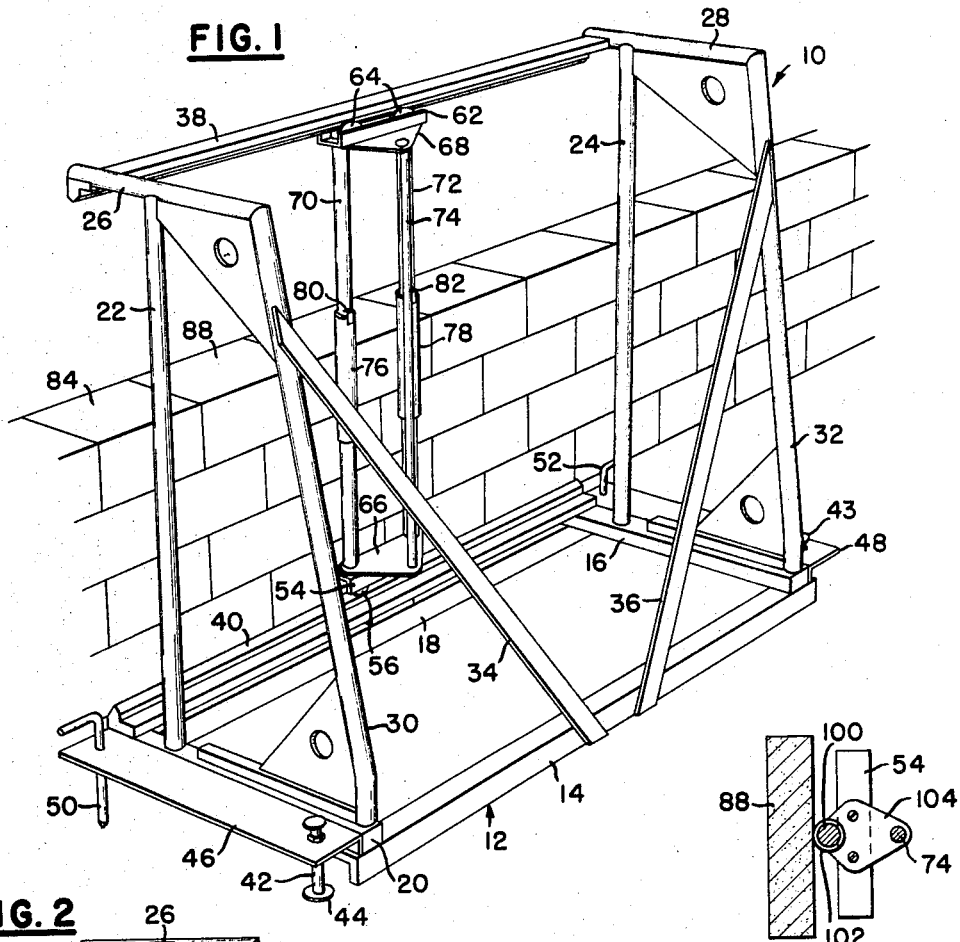
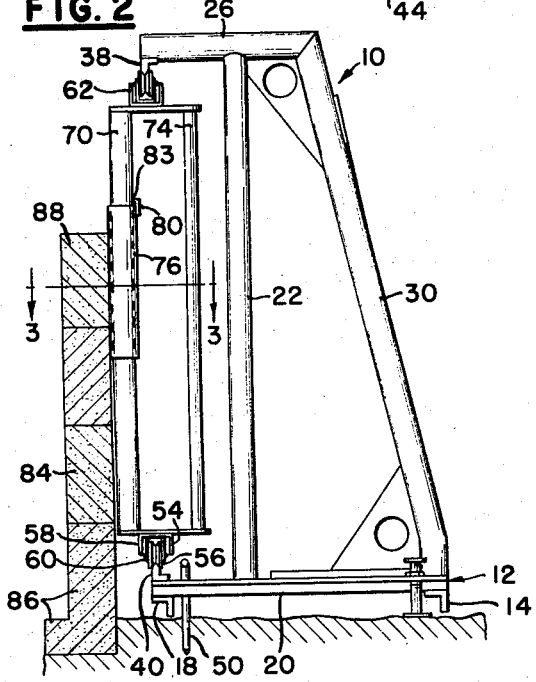
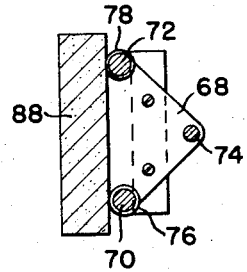
INVENTOR.
JOSEPH SCHNEIDER
BY *James N. Lyles*
   *John H. Oltman*
ATTORNEY

UNITED STATES PATENT OFFICE 3,422,539
Patented Jan. 21, 1969

3,422,539
BLOCK OR BRICK LAYING GUIDE
Joseph Schneider, 5710 Raleigh St.,
Hollywood, Fla. 33021
Filed Jan. 26, 1968, Ser. No. 700,853
U.S. Cl. 33—85  10 Claims
Int. Cl. G01c 15/10

ABSTRACT OF THE DISCLOSURE

A device in which carriages riding on vertically spaced horizontal and parallel tracks carry one or more guide members movable horizontally with the carriages to position the guide member or members in abutment with blocks or bricks being layed to render them plumb. The guide member or members may be adjustable vertically to different positions to abut blocks or bricks in vertically successive courses of a wall.

Background of the invention

In the laying of blocks and bricks to build walls for buildings, the work is slowed down by the time consumed in manipulating plumb lines to assure that the wall will be plumb. A wall could be built more efficiently and at less cost if an effective guide were available wihch would enable the worker to lay the blocks or bricks and guide them into a plumb and aligned condition easily and quickly.

Summary of the invention

The present invention provides a device in which a guide member is mounted on carriages movable on tracks parallel to the wall to be built. The guide member in one embodiment is a sleeve encircling a rod which extends between and is affixed to the carriages, and the sleeve is movable horizontallly with the carriages and vertically relative to the rod. Each block may be butted against the sleeve as it is layed, and the sleeve may be moved to receive successive blocks or bricks and also to traverse a group of blocks or bricks to render them plumb and aligned. After a wall has been built up to the top of the sleeve, the sleeve may be moved up on the rod to position blocks or bricks in successive courses. In another embodiment, two sleeves and rods are provided, and they are spaced horizontally a distance less than the length of a brick or block. A given block or brick may be layed by butting it against the two sleeves so that it is automatically aligned horizontally and made plumb as it is layed. The sleeves are movable both horizontally and vertically to receive further blocks or bricks. In either embodiment, the sleeve or sleeves may be rotatable to facilitate horizontal movement thereof.

Accordingly, it is an object of the present invention, to provide a guide device for facilitating the laying of blocks or bricks in a plumb and horizontally aligned condition.

Another object of the invention is to provide a block or brick laying guide device wherein a guide member of the device against which blocks or bricks are abutted during the laying thereof is movable both horizontally and vertically to position the guide member in abutment with each block or brick of a wall or portion thereof.

A further object of the invention is to provide a block or brick laying guide device including vertically spaced carriages having wheels riding on tracks, a vertical rod connected to the carriages, and a sleeve movable vertically on the rod to selected positions where it remains, so that the sleeve is movable both horizontally and vertically to position it in abutment with each block or brick of a wall as the wall is built to align the blocks or bricks horizontally and make them plumb.

A further object of the invention is to provide a device as described in the last preceding paragraph including a second rod with a sleeve thereon spaced from the first a rod and sleeve a distance less than the length of a block or brick so that a given block or brick can be abutted against both sleeves to assure that it is in proper horizontal alignment as well as plumb.

Other objects of this invention will appear in the following description and appended claims, reference being had to the accompanying drawings forming a part of this specification wherein like reference characters designate corresponding parts in the several views.

On the drawings:

FIGURE 1 is a perspective view of a block or brick laying guide device in accordance with one embodiment of the invention;

FIGURE 2 is an end view of the guide device of FIGURE 1;

FIGURE 3 is a cross-sectional view of part of the device and a wall taken along line 3—3 of FIGURE 2 looking in the direction of the arrows; and FIGURE 4 is a cross-sectional view similar to FIGURE 3, but showing the guide member of another embodiment of the invention Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed heein is for the purpose of description and not of limitation.

As shown on the drawings:

The guide device 10 includes a frame generally designated 12 including lower horizontal members 14, 16, 18 and 20 which are connected together at their ends to form a rectangular base. Upright posts 22 and 24 are connected as by welding to horizontal members 20 and 16 respectively, and the tops of posts 22 and 24 are connected to upper horizontal members 26 and 28. Slanting posts 30 and 32 are connected at their upper ends to members 26 and 28 and at their lower ends to members 20 and 16, and angular braces 34 and 36 are connected at their upper ends to posts 30 and 32 and at their lower ends to horizontal member 14

Upper horizontal members 26 and 28 project beyond upright posts 22 and 24, and an upper track member 38 is connected as by welding to members 26 and 28. A lower track member 40 is attached at its ends to horizontal members 16 and 20. The two tracks 38 and 40 are supported by the frame 12 in alignment with each other, both tracks being horizontal, parallel to each other, and vertically aligned. The frame 12 is adjustable so that a plane including both tracks may be made vertical. This adjustment may be accomplished by means of adjusting screws 42 and 43 affixed to plates 46 and 48 attached respectively to member 20 a 16. Screws 42 and 43 have a pad 44 at their bottom end which is to rest on the ground, and the screws may be adjusted vertically by turning them to raise or lower the rear end of the frame to adjust the tracks.

The frame 12 is positioned next to a place where a wall is to be built by laying bricks or blocks, and the tracks 38 and 40 are made parallel to the line of the intended wall. Screws 42 and 43 are then adjusted to line up the tracks as previously described. Stakes 50 and 52 which extend through plates 46 and 48 respectively may then be driven into the ground to anchor the frame. It does not matter if tracks 38 and 40 are not exactly horizontal, but they should be at least approximately horizontal.

A lower carriage 54 includes two grooved wheels 56 which ride on lower track 40. Carriage 54 may include a U-shaped member 58 with a bracket 60 secured to the inside thereof and with the wheels 56 pinned to brackets 60 for rotation.

An upper carriage 62 has two wheels 64 which ride on the upper track 38. Upper carriage 62 may be constructed the same as lower carriage 54 and is inverted relative to lower carriage 54.

Plates 66 and 68 are attached respectively to carriages 54 and 62. Three rods 70, 72 and 74 are connected at one end to plate 66 and at the other end to plate 68, and the rods and plates provide an interconnecting structure which connects the two carriages together for joint movement along the tracks. Rods 70 and 72 are rotatable relative to the carriages. Rod 74 also serves as a handle which can be grasped to push the carriages along the tracks.

Mounted on rods 70 and 72 are two sleeves 76 and 78, these sleeves serving as guide members as will be explained. Sleeves 76 and 78 loosely encircle rods 70 and 72 so that they are free to be moved vertically on rods 70 and 72. Sleeves 76 and 78 should remain at whatever position they are set on rods 70 and 72. In the illustrated embodiment, this is accomplished by providing spring fingers 80 and 82 affixed respectively to sleeves 76 and 78 and each having a turned over end 83 which is urged against the corresponding rod to frictionally hold the sleeves in place. However, it will be understood that some sort of friction device could be provided inside sleeves 76 and 78 which would connect them to the rods sufficiently to hold them in a given vertical position. The sleeves and rods rotate together. It may be noted that rods, posts and other cylindrical members of the device may be in the form of tubes so as to make them light.

In the drawings, a wall 84 is shown after it has been partially built on a foundation 86. Wall 84 includes blocks or bricks 88 which are slightly longer than the horizontal space between sleeves 76 and 78. Thus, each block can be layed by abutting it against the two sleeves 76 and 78 and the block will automatically become aligned with other blocks in the horizontal direction and plumb in the vertical direction.

In use, the guide device 10 is set up next to the position for a wall as previously described. Sleeves 76 and 78 are lowered until they are exactly opposite the position desired for a block or brick. As shown in FIGURE 3, a block 88 is layed, say on the foundation 86, and at the same time is butted against the two sleeves 76 and 78 which automatically guide the block or brick to make it plumb and horizontally aligned with the desired line of the wall. The carriages are then moved to the position for the next block or brick, and it is layed in the same way. This may be continued to lay a whole course. The sleeves 76 and 78 are then raised to position them opposite the line of the next course, and blocks or bricks are layed in the same manner as for the previous course.

In the drawings, the sleeves 76 and 78 are shown as having a height only slightly greater than one block or brick. However, it will be understood that the sleeves could be made to have a height slightly greater than two or more blocks or bricks if desired. Also, it is apparent that two or more of the guide devices could be placed side by side to eliminate any need for moving the entire device in the building of a wall. The guide device would ordinarily be made as high as the walls of ordinary one-story buildings and could find a wide application even though practically limited to such one-story buildings.

FIGURE 4 shows a slight modification of the guide device, and only the modified portion of the device is shown since the rest of the device may be identical to that of FIGURES 1–3. In FIGURE 4, a single guide rod 100 and sleeve 102 is provided between the carriages. Rod 100 is shown as being affixed for rotation to a plate 104 on the lower carriage 54. Another rod 74 serves as a handle as previously described.

In use of the embodiment of FIGURE 4, a block or brick 88 is butted against the single sleeve 102 as it is layed, and is automatically guided by the sleeve into a plumb position. It is possible that the block or brick would be layed out of horizontal alignment, but this may be remedied by moving the carriages horizontally so that sleeves 102 rolls along block or brick 88 and pushes it into alignment. It may be possible to lay several blocks or bricks and then move the carriages so as to roll sleeve 102 along all of the bricks or blocks thus aligning them and making them plumb at the same time. However, it is believed that this would not be as satisfactory as butting each block or brick against sleeve 102 as it is layed.

Thus, the invention provides a guide device which facilitates the laying of blocks or bricks by rendering them plumb and aligned as they are layed. The device is not complicated, and should be most helpful to masons.

Having thus described my invention, I claim:

1. A block or brick laying guide device including in combination a frame, a lower track supported by said frame in a generally horizontal position, an upper track supported by said frame in a generally horizontal position spaced over and parallel to said lower track, said frame being adjustable to position said tracks in a plumb condition, a first carriage having wheel means riding on said lower track, a second carriage having wheel means riding on said upper track, means connecting said carriages together for joint horizontal movement relative to said tracks, and guide means on said connecting means adapted to abut blocks or bricks layed to form a wall adjacent said device and movable horizontally with said carriages to position said guide means in abutment with blocks or bricks to render the same plumb.

2. A block or brick laying guide device as claimed in claim 1 in which said guide means is adjustable vertically to different positions wherein said guide means may abut blocks or bricks in vertically successive courses of a wall.

3. The block or brick laying guide device as claimed in claim 2 in which said connecting means includes a rotatable rod affixed at opposite ends thereof to said carriages, and said guide means comprises a sleeve encircling said rod and means frictionally coupling said sleeve to said rod so that said sleeve is rotatable with said rod and can be adjusted to different positions vertically of said rod.

4. The block or brick laying guide device as claimed in claim 3 in which said connecting means includes a further rod affixed at opposite ends thereof to said carriages for strengthening said connecting means and providing a rod to be grasped to move said carriages jointly.

5. The block or brick laying guide device as claimed in claim 4 in which said carriages are inverted relative to each other.

6. A block or brick laying guide device as claimed in claim 1 in which said guide means comprises first and second separate guide members spaced apart horizontally a distance less than the length of a block or brick to be layed and aligned laterally so that a plane through said guide members is parallel to said wall, said guide members being movable horizontally with said carriages to position the same opposite a given block or brick as it is layed so that such block or brick may be butted against said guide members to align the same both horizontally and vertically.

7. A block or brick laying guide device as claimed in claim 6 in which each of said guide members are adjustable vertically, to different positions wherein said guide members may abut blocks or bricks in vertically successive courses of a wall.

8. A block or brick laying guide device as claimed in claim 7 in which said connecting means includes a pair of rotatable rods each affixed at opposite ends thereof to said carriage, said rods extending vertically parallel to each other, and said guide members each comprise a sleeve encircling a respective one of said rods and means frictionally coupling each said sleeve to the corresponding rod so that each said sleeve is rotatable with said corresponding rod and can be adjusted to different positions vertically of said rod.

9. A block or brick laying guide device as claimed in claim 8 in which said connecting means includes a further rod affixed at opposite ends thereof to said carriages for strengthening said connecting means and providing a rod to be grasped to move said carriages jointly.

10. A block or brick laying guide device as claimed in claim 9 in which said carriages are inverted relative to each other.

References Cited

UNITED STATES PATENTS 2,641,846   6/1953   Zeno.

FOREIGN PATENTS 1,048,718   8/1953   France.
367,617   11/1963   Switzerland.

HARRY N. HAROIAN, *Primary Examiner.*